(12) United States Patent
Ihara et al.

(10) Patent No.: US 11,446,608 B2
(45) Date of Patent: Sep. 20, 2022

(54) METHOD FOR REDUCING HTO CONCENTRATION IN AQUEOUS SOLUTION

(71) Applicants: Kinki University, Osaka (JP); A ATOM TECHNOL KINDAI, Osaka (JP); TOYO ALUMINIUM KABUSHIKI KAISHA, Osaka (JP)

(72) Inventors: Tatsuhiko Ihara, Hiroshima (JP); Hirokuni Yamanishi, Osaka (JP); Hiroshi Noma, Osaka (JP); Toshifumi Taira, Osaka (JP); Takashi Hoshiya, Osaka (JP); Kazuya Fujimoto, Osaka (JP)

(73) Assignees: KINKI UNIVERSITY, Osaka (JP); A ATOM TECHNOL KINDAI, Osaka (JP); TOYO ALUMINIUM KABUSHIKI KAISHA, Osaka (JP)

( * ) Notice: Subject to any disclaimer, the term of this patent is extended or adjusted under 35 U.S.C. 154(b) by 384 days.

(21) Appl. No.: 16/617,935

(22) PCT Filed: May 29, 2018

(86) PCT No.: PCT/JP2018/020607
§ 371 (c)(1),
(2) Date: Nov. 27, 2019

(87) PCT Pub. No.: WO2018/221531
PCT Pub. Date: Dec. 6, 2018

(65) Prior Publication Data
US 2021/0138404 A1    May 13, 2021

(30) Foreign Application Priority Data
May 29, 2017   (JP) .............................. JP2017-105189

(51) Int. Cl.
*B01D 59/26*    (2006.01)
*B01J 20/08*    (2006.01)
*B01J 20/10*    (2006.01)
*B01J 20/18*    (2006.01)
*B01J 20/28*    (2006.01)
*G21F 9/12*     (2006.01)

(52) U.S. Cl.
CPC .............. *B01D 59/26* (2013.01); *B01J 20/08* (2013.01); *B01J 20/103* (2013.01); *B01J 20/18* (2013.01); *B01J 20/2808* (2013.01); *B01J 20/28047* (2013.01); *B01J 20/28059* (2013.01); *B01J 20/28061* (2013.01); *B01J 20/28083* (2013.01); *G21F 9/12* (2013.01)

(58) Field of Classification Search
CPC ......... B01D 59/26; B01J 20/08; B01J 20/103; B01J 20/18; B01J 20/28047; B01J 20/28059; B01J 20/28061; B01J 20/2808; B01J 20/28083; G21F 9/12

USPC .......................................................... 588/20
See application file for complete search history.

(56) References Cited

U.S. PATENT DOCUMENTS

2012/0042688 A1    2/2012    Avery et al.

FOREIGN PATENT DOCUMENTS

| JP | 10-128072 A | 5/1998 |
|----|----|----|
| JP | 2015-164709 A | 9/2015 |
| JP | 2016-151475 A | 8/2016 |
| JP | 2017-504785 A | 2/2017 |
| KR | 100736020 B1 | 7/2007 |
| WO | 2015/072981 A1 | 5/2015 |
| WO | 2016/031896 A1 | 3/2016 |
| WO | 2016/158549 A1 | 10/2016 |
| WO | 2016/199800 A1 | 12/2016 |

OTHER PUBLICATIONS

International Preliminary Report on Patentability for Corresponding International Application No. PCT/JP2018/020607, dated Apr. 10, 2019.

(Continued)

*Primary Examiner* — Edward M Johnson
(74) *Attorney, Agent, or Firm* — Marshall, Gerstein & Borun LLP

(57) ABSTRACT

The present invention relates to a method for reducing the HTO concentration in a tritium-containing aqueous solution. The present invention includes bringing water vapor or the like of a tritium-containing aqueous solution into contact with a porous material having pores in a pore diameter range of 500 Å or less, selectively occluding the HTO in the tritium-containing aqueous solution in the porous material, and obtaining a tritium-containing aqueous solution in which the HTO concentration thereof is reduced. The present invention relates to a device used for reducing the HTO concentration in a tritium-containing aqueous solution. The present invention includes a reservoir for a raw tritium-containing aqueous solution, a means for generating water vapor or the like of the tritium-containing aqueous solution, an occlusion means in which is accommodated a porous material having pores in a pore diameter range of 500 Å or less, and a means for recovering the tritium-containing aqueous solution in which the HTO concentration is reduced. The present invention furthermore includes a transfer means for transferring the water vapor or the like to the occlusion means, and a means for transferring the tritium-containing aqueous solution in which the HTO concentration is reduced from the occlusion means to a recovery means.

12 Claims, 8 Drawing Sheets

(56) References Cited

OTHER PUBLICATIONS

International Search Report and Written Opinion for Corresponding International Application No. PCT/JP2018/020607, dated Aug. 28, 2018, 13 pages.
J. Plasma Fusion Res., 85(10)726-735 (2009).
Material in the website of Tokyo Electric Power Company Holdings, Inc., Regarding current state of tritium at Fukushima-Daiichi Nuclear Power Plant [Material 4-1] on Apr. 26, 2013, (http://www.tepco.co.jp/nu/fukushima-np/roadmap/images/c130426_06-j.pdf).
Material of Mitsubishi Research Institute, Inc. regarding, tritium separating technology verification test business, reported in Oct. 2014.
Materials in the website of Gloval Energy Policy Research, Removal of tritium from water becomes possible—Rosatom (http://www.gepr.org/ja/contents/20160719-01/).
Extended European Search Report dated Jan. 29, 2020 issued in the corresponding European Patent Application No. 18809285.2.

METHOD FOR REDUCING HTO CONCENTRATION IN AQUEOUS SOLUTION

TECHNICAL FIELD

The present invention relates to a method and an apparatus for reducing the HTO concentration in tritiated water (HTO)-containing aqueous solution. Particularly, the present invention relates to a method for reducing the HTO concentration in a HTO-containing aqueous solution using an aluminum powder sintered porous body and effective for removal of HTO in a HTO-containing contaminated water.

BACKGROUND ART

For the treatment of a large amount of contaminated water still being generated even currently by the Fukushima-Daiichi nuclear power plant accident, the Advanced Liquid Processing System (ALPS) manufactured by TOSHIBA CORPORATION has been in operation. However, objects to be decontaminated are limited to radionuclides except for tritium. This is based on the fact that the chemical properties of tritium (most of which is present as tritiated water (HTO)) in contaminated water are the same as those of water. Therefore, contaminated water containing HTO has hardly made progress in its treatment, and has been continued to be stored every day even today. The total volume of the contaminated water stored in tanks exceeds 800,000 tons. The details can be confirmed by the portal site of the Ministry of Economy, Trade and Industry website, "decommissioning/contaminated water countermeasure portal site" and "tritiated water task force report".

The HTO removing methods used in the world today mainly include 1) vacuum water distillation (WD process), 2) water/hydrogen isotope exchange reaction combining electrolysis (CSCE process), 3) dual temperature water/hydrogen isotope exchange reaction (BHW process), and 4) water/hydrogen sulfide isotope exchange reaction (GS process) (NPL 1). However, any process is insufficient in terms of performances and price for use as a countermeasure to the Fukushima nuclear power plant contaminated water. It is currently announced that the process of combination of 2) and 3) of Russian national nuclear power enterprise "Rosatom" has a high decontamination effect (NPL 2).

The contaminated water including HTO currently stored in tanks at the Fukushima-Daiichi nuclear power plant has been continued to be stored every day even today. Under such circumstances, a HTO separating and removing technology has been under development. As the subsidy business operator screening results in accordance with "tritium separating technology verification test project" according to the data of Mitsubishi Research Institute, Inc., reported in October 2014 (NFL 1), three cases by Kurion, Inc. (America), GE Hitachi Nuclear Energy Canada Inc. (Canada) and RosRAO (Russia) have been adapted. However, it is assumed that each practical utility is insufficient in terms of energy consumption, the size of facilities, the necessity of additional apparatuses for ensuring safety, and running cost.

[NPL 1] Material in the website of Tokyo Electric Power Company Holdings, Inc., "Regarding current state of tritium at Fukushima-Daiichi Nuclear Power Plant [Material 4-1] on 26 Apr. 2013" (http://www.tepco.co.jp/nu/fukushima-np/roadmap/images/c130426_06-j.pdf)

[NPL 2] Materials in the website of Gloval Energy Policy Research, "Removal of tritium from water becomes possible—Rosatom" (http://wwvv.geprorg/ja/contents/20160719-01/)

[NPL 3] Material of Mitsubishi Research Institute, Inc. reported in October 2014 (regarding "tritium separating technology verification test business")

[NPL 4] J. Plasma Fusion Res., Vol. 85, No. 10 (2009) 726-735

SUMMARY OF INVENTION

Technical Problem

The present invention provides novel method and apparatus for separating tritiated water molecule (HTO) from HTO-containing water, with high feasibility.

Solution to Problem

It has been known that, when heavy water ($D_2O$) is allowed to be adsorbed on $Fe_2O_3$ at room temperature in place of tritiated water (HTO), followed by exposure to $H_2O$ similarly at room temperature to perform isotope exchange, the ease of occurrence of exchange varies according to the existing state of $D_2O$ (NPL 4: J. Plasma Fusion Res., Vol. 85, No. 10 (2009) 726-735). Based on this finding, the present inventors presumed that the same is true for HTO, and, when HTO is allowed to be adsorbed under environment in which HTO tends to have interaction, an isotope exchange reaction with light water ($H_2O$) may less likely to occur, which enables selective occlusion of HTO.

Based on this presumption, the present inventors studied a method for separating HTO from tritium-containing water by means using a difference in physical/chemical characteristics between light water ($H_2O$) and tritiated water (HTO).

The present inventors considered that a structure in which a fine structure of a metal oxide or a metal hydroxide has been developed, for example, a porous structure having a gap into which water molecules can penetrate between layers can provide a space of microscale (2 nm or less), or meso scale (2 to 50 nm) with a high surface hydroxy group density; and the site can function as a concentrating and occluding space of HTO. The noticed material is an aluminum powder sintered porous body used in electric occlusion of cesium (Japanese Patent Application No. 2016-027321). This material is subjected to a boehmite treatment, so that a needle-shaped or petal-shaped boehmite crystal (metal hydrous oxide of aluminum) grows in the porous body, resulting in an increase in the hydroxy group amount per unit volume as well as the specific surface area (see FIG. 1). Further, boehmite is in a layered structure in which unit layers each in octahedron of $AlO_6$ sharing a ridgeline are stacked one on another as shown in FIG. 3 (Kenichi Sakamoto, Light Metals, Vol. 22, No. 4, P. 295 (1972)), and is expected to hold HTO in its interlayer micro space or meso space by capillary condensation. Note that the Al in the octahedron of $AlO_6$ is surrounded by five oxygens and one hydroxy group, and the structure of one layer formed of the octahedron of $AlO_6$ of FIG. 3 is FIG. 4. The inventors experimentally found that, for the aluminum powder sintered porous body subjected to a boehmite treatment, the grown crystal surface thereof has a relatively intense interaction with HTO at a relatively lower temperatures.

Further, using a plurality of porous bodies other than the aluminum powder sintered porous body subjected to a boehmite treatment, and having a known pore diameter, the concentrating and occluding actions of HTO were studied. Note that HTO and $D_2O$ are isotopic to each other, and both have a mass number of 20, and thus are equal in mass number to each other. For this reason, the effect by mass (on the physical adsorption or the physical desorption) can be considered to be equal between HTO and $D_2O$. $D_2O$ was used for this study. As a result, the present inventors found that the use of a porous body having pores with a pore diameter falling within the range of 500 Å or less enables separation of HTO, and particularly, the use of a porous body having pores with a pore diameter falling within the range of more than 4 Å and 25 Å or less enables high-efficiency separation of HTO occluded in the porous body at relatively lower temperatures, even for those other than an aluminum powder sintered porous body subjected to a boehmite treatment. As a result, the present inventors completed the present invention.

The present invention are as follows.

[1] A method for reducing the HTO concentration in a tritium-containing aqueous solution, the method comprising:

continuously or intermittently bringing water vapor and/or mist of a tritium-containing aqueous solution into contact with a porous body having pores with a pore diameter within the range of 500 Å or less to allow HTO in the tritium-containing aqueous solution to be selectively occluded in the porous body, and obtaining an unoccluded liquid as a tritium-containing aqueous solution reduced in HTO concentration (which will be hereinafter referred to as low-tritium-content water), the porous body being a boehmite treated product.

[2] The method according to [1], wherein the porous body has at least a pore with a pore diameter falling within the range of more than 4 Å and 25 Å or less.

[3] The method according to [1] or [2], wherein the porous body is an inorganic material porous body.

[4] The method according to [3], wherein the inorganic material porous body is a porous body containing at least one selected from the group consisting of zeolite, γ-alumina, silica gel, boehmite, and aluminum.

[5] The method according to [3], wherein the inorganic material porous body is a porous body of aluminum having a boehmite coating.

[6] The method according to any of [1] to [5], wherein the inorganic material porous body is a powder.

[7] The method according to any of [1] to [5], wherein the inorganic material porous body is a powder sintered porous body.

[8] The method according to any of [1] to [7], wherein the porous body has a specific surface area ranging from 5 to 250 $m^2/g$.

[9] The method according to any of [1] to [8], wherein the porous body with which water vapor or mist of the HTO-containing aqueous solution is brought into contact is held at a temperature equal to or lower than an endothermic peak temperature in differential scanning calorimetry of HTO adsorbed in the pore of the porous body.

[10] The method according to [9], wherein the porous body has an endothermic peak temperature in differential scanning calorimetry of HTO adsorbed in the pore of the porous body falling within the range of 60° C. to 100° C.

[11] The method according to any of [1] to [10], wherein water vapor and/or mist of the HTO-containing aqueous solution is supplied under a pressure within the range of from atmospheric pressure to the saturated vapor pressure of the HTO-containing aqueous solution, and is brought into contact with the porous body, thereby allowing HTO to be selectively adsorbed on the porous body, and the HTO-containing aqueous solution reduced in HTO concentration (low-HTO-content water) is obtained by making the downstream side of the porous body more negative in pressure than the supplying side of the HTO-containing aqueous solution to allow preferential transpiration of light water from the porous body surface.

[12] The method according to any of [1] to [11], wherein the contact between the water vapor and/or mist of the HTO-containing aqueous solution and the porous body is performed under reduced pressure.

[13] The method according to any of [1] to [12], wherein the porous body includes a plurality of porous bodies, and the method comprises that the water vapor and/or mist of the HTO-containing aqueous solution includes coming into sequential contact with the plurality of porous bodies.

[14] The method according to [13], wherein a HTO concentration reduction rate of the HTO-containing aqueous solution reduced in HTO concentration obtained after contact with the porous body increases with an increase in number of the porous bodies.

[15] The method according to any of [1] to [14], the method comprises collecting and storing the porous body occluding a prescribed amount of HTO.

[16] The method according to any of [1] to [15], the method further comprises, allowing the collected porous body to release the occluded HTO, and collecting the released HTO.

[17] An apparatus for use in reduction of HTO concentration in a tritium-containing aqueous solution, the apparatus comprising:

a reservoir of a raw material HTO-containing aqueous solution, means that generates water vapor and/or mist of the HTO-containing aqueous solution in the reservoir, occluding means incorporating a porous body having pores with a pore diameter falling within the range of 500 Å or less, and means that collects the HTO-containing aqueous solution reduced in HTO concentration, and the apparatus further comprising:

transferring means for transferring the water vapor and/or mist to the occluding means, and means that transfers the HTO-containing aqueous solution reduced in HTO concentration from the occluding means to the collecting means.

[18] The apparatus according to [17], wherein the porous body has at least a pore with a pore diameter falling within the range of more than 4 Å and 50 Å or less.

[19] The apparatus according to [17] or [18], wherein the porous body includes a plurality of porous bodies, and the plurality of porous bodies are incorporated in multiple stages in the occluding means.

[20] The apparatus according to any of [17] to [19], wherein the porous body is an inorganic material porous body.

[21] The apparatus according to [20], wherein the inorganic material porous body is a porous body comprising at least one selected from the group consisting of zeolite, γ-alumina, silica gel, boehmite, and aluminum.

[22] The apparatus according to [20], wherein the porous body is a porous body of aluminum having a boehmite coating.

[23] The apparatus according to any of [17] to [22], wherein the porous body has a specific surface area ranging from 5 to 250 $m^2/g$.

[24] The apparatus according to any of [17] to [23], wherein the porous body is detachable in the occluding means.

[25] The apparatus according to any of [17] to [24] to be used for implementation of any method of [1] to [16].

Advantageous Effects of Invention

In accordance with the present invention, separation of HTO by occlusion at relatively lower temperatures is possible. The materials for use in HTO occlusion may only be porous bodies having pores with a pore diameter falling within the range of 500 Å or less, and can be, for example, an aluminum powder sintered porous body, and other commercially available inorganic material porous bodies, and are available at a relatively lower price. Further, the occluded HTO can be readily released from the occluding material by increasing the temperature, and can also be collected again separately. For this reason, the present invention can be expected as supplying means to for fuel for nuclear fusion reaction experiment, or the like, and can provide a removing method excellent in cost performance when the tritium economy is established.

DESCRIPTION OF EMBODIMENTS

Figure 1:
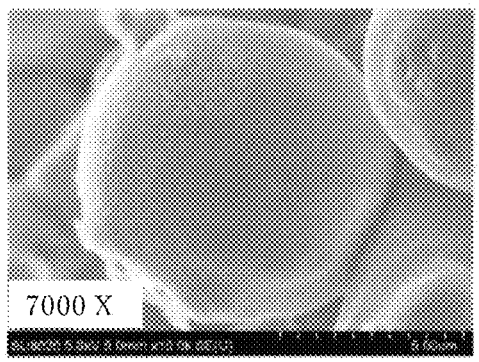
FIG. 1 is an electron micrograph of boehmite crystal grown at the porous aluminum material surface.
Figure 1:
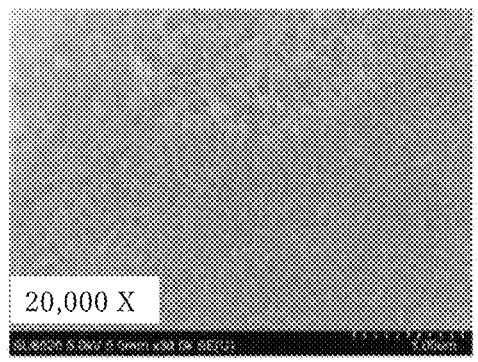
Figure 1:
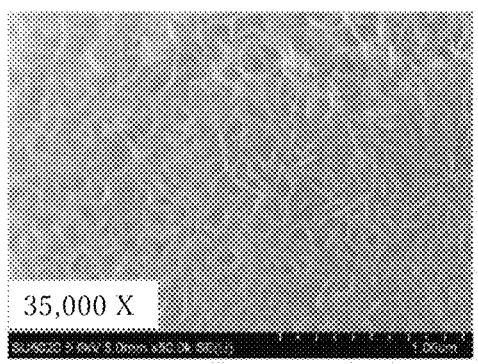
Figure 1:
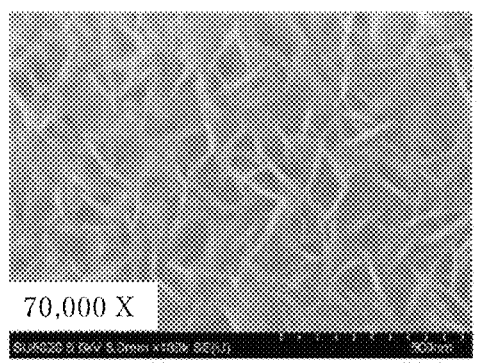

The present invention is a method for reducing the HTO concentration in a HTO-containing aqueous solution. This method includes bringing water vapor and/or mist of a HTO-containing aqueous solution into contact with a porous body having pores with a pore diameter falling within the range of 500 Å or less, allowing HTO in the HTO-containing aqueous solution to be selectively occluded in the porous body, and obtaining a HTO-containing aqueous solution reduced in HTO concentration.

<HTO-Containing Aqueous Solution>

A HTO-containing aqueous solution has a different HTO content according to the generation process thereof, and can be, for example, a substance containing HTO in a concentration within the range of 100 Bq/L to 5 MBq/L. Examples of the HTO-containing aqueous solution may include contaminated water generated by the Fukushima-Daiichi nuclear power plant accident, and water containing HTO generated by neutron capturing in the operation of a lightwater reactor.

<Porous Body>

The porous body for use in the present invention is a porous body having pores with a pore diameter falling within the range of 500 Å (50.0 nm) or less. The lower limit of the pore diameter of the porous body is preferably 4 Å (0.4 nm). Therefore, the porous body is preferably a porous body having pores with a pore diameter falling within the range of 4 Å or more and 500 Å or less. Particularly, the porous body may be preferably a porous body having pores with a pore diameter falling within the range of more than 4 Å (0.4 nm) and 50 Å (5.0 nm) or less. From the results of Test Examples 1 to 4 described later, the present inventors found that the porous body with a pore diameter falling within this range can undergo separation of HTO by occlusion at relatively lower temperatures. The porous body may also have a pore with a pore diameter outside the foregoing range. The pore diameter in the present invention is measured by multi-specimen high-performance specific surface area/pore distribution measuring apparatus 3Flex (manufactured by SHIMADZU CORPORATION).

A porous body with a pore diameter falling within the foregoing range can be, for example, an inorganic material porous body. Further, the inorganic material porous body can be, for example, a porous body including at least one selected from the group consisting of zeolite, γ-alumina, silica gel, boehmite, and aluminum. Further, the porous body can be a porous body of aluminum having a boehmite coating.

The porous body can further have a specific surface area falling within the range of, for example, 5 to 250 $m^2/g$, and preferably within the range of 10 to 200 $m^2/g$.

For zeolite, materials having various pore distributions are known, and materials are often commercially available. The zeolite to be used as a porous body in the present invention is preferably mordenite of a natural product in view of the pore diameter, the specific surface area, and the like. However, it is not intended that the present invention be limited to mordenite.

The fine polar diameter of γ-alumina has been reported within the range of about 85 Å to 150 Å according to the preparation conditions. From the DSC measurement results of $H_2O$ and $D_2O$ (or HTO)-adsorbed samples, preferable is a material with a pore diameter such that a difference is observed in endothermic peak temperature between $H_2O$ and $D_2O$ (or HTO).

For silica gel, from the DSC measurement results of $H_2O$ and $D_2O$ (or HTO)-adsorbed samples, preferable is a material with a pore diameter such, that a difference is observed in endothermic peak temperature between $H_2O$ and $D_2O$ (or HTO).

An aluminum powder sintered porous body before a boehmite treatment is, for example, a sintered body of aluminum powder with an average particle diameter of 1 to 20 μm, and a specific surface area within the range of 0.1 to 1 m²/g in calculated value. The product before the boehmite treatment does not contain other components than aluminum except for inevitable impurities. The purity of aluminum is preferably 99.9 mass % or more, and more preferably 99.99 mass % or more. The product before the boehmite treatment is manufactured by sintering an aluminum power with an average particle diameter $D_{50}$ of 1 to 20 μm under an inert atmosphere within a temperature range of 500° C. to 650° C., and has a porosity of about 45% to 60%, and holds a high electroconductivity. Further, after sintering, the entire surface also including the void inside is covered with a thin oxide coating by natural oxidation. The oxide coating exerts high chemical stability and environmental resistance, and functions as an adsorbing (occluding) site for cations.

The product before the boehmite treatment thus obtained has a specific surface area within the range of 0.1 to 1 m²/g in calculated value, and also within almost equal range of 0.1 to 1 m²/g also in actual value (the method will be described later). The specific surface area varies according to the particle diameter of aluminum powder for use in sintering, and the sintering conditions. The specific surface area falls within the range of 0.1 to 1 m²/g, and preferably within the range of 0.15 to 0.5 m²/g both in calculated value and actual value. After sintering, the product before the boehmite treatment is subjected to a boehmite treatment, resulting in a boehmite treated product. The boehmite treatment is known as, for example, a technology of subjecting alumina gel to a hot water treatment, and thereby forming a boehmite thin coating in a fine uneven shape or a petal shape on a glass substrate or a polymer substrate. In the present invention, specifically, the boehmite treatment is performed by immersing a product before the boehmite treatment in water at 90° C. or more, and preferably 95° C. or more for 1 to 60 minutes.

An aluminum-based oxide coating is formed on the surface by the boehmite treatment. The aluminum-based oxide coating is a coating of at least one aluminum-based oxide selected from the group consisting of γ-alumina and alumina hydrate. Further, the boehmite treatment increases the specific surface area (actual value). The specific surface area of a boehmite treated product falls within the range of 5 to 50 m²/g, preferably within the range of 8 to 16 m²/g, more preferably within the range of 9 to 16 m²/g, and further preferably within the range of 10 to 16 m²/g, and is most preferably a specific surface area of more than 10 m²/g in actual value. The boehmite treated product is a sintered body of an aluminum powder with an average particle diameter of 1 to 20 μm, and has an aluminum type oxide coating on the surface, and has a specific surface area within the range of 5 to 20 m²/g in actual value. The actual measurement of the specific surface area can be carried out by means of a fluid type specific surface area automatic measuring apparatus FlowSorb III2305 (manufactured by Shimadzu Corporation) using nitrogen molecules.

As the boehmite treatment method, other than the method using hot water (purified water), a method using an aqueous solution containing a basic compound such as amine or ammonia and exhibiting basicity can also be used.

The aluminum type oxide coating formed on the surface by the boehmite treatment is alumina hydrate expressed as AlOOH or $Al_2O_3 \cdot H_2O$, and is generated by treating aluminum with boiling water, and is known to be excellent in corrosion resistance, and can additionally include an ampho-teric hydroxide including a hydroxide ion OH⁻ as an anion of aluminum, and expressed as a general formula $Al(OH)_n$ (e.g., n=3).

The porous body preferably has a prescribed shape, and can be, for example, in a powder-shaped, disk-shaped, sheet-shaped, or honeycomb-shaped structure as a prescribed shape.

<Occlusion to Porous Body>

A HTO-containing aqueous solution is brought into contact with a porous body in the form of water vapor and/or mist. More specifically, when the HTO-containing aqueous solution is formed into water vapor, the HTO-containing aqueous solution is heated, and when formed into mist, the HTO-containing aqueous solution is supplied to a mist generating device such as a nebulizer. Water vapor and/or mist comes in contact with the porous body, so that HTO is selectively occluded into the porous body by the direct occlusion of HTO included in the HTO-containing aqueous solution into the porous body, or the isotope exchange reaction with light water ($H_2O$) already occluded therein. The reason why the HTO included in the HTO-containing aqueous solution is selectively occluded in the porous body is basically presumed to be the difference in equilibrium water vapor pressure between light water and HTO.

The reason why the HTO included in the HTO-containing aqueous solution is selectively occluded in the porous body is basically presumed to be based on the principle similar to the principle of the water distillation process. The water distillation process is a process in which a component with a lower equilibrium vapor pressure is concentrated to a liquid phase by the distillation operation of repeating vaporization and condensation using a difference in equilibrium vapor pressure among a plurality of components in the solution. A distillation column is used in the apparatus for the water distillation process, a boiler is placed at the column bottom to thereby generate a vapor, and a condenser is set at the column top to thereby return the vapor to water, thus forming a reflux. The HTO with a low equilibrium vapor pressure is condensed at the column wall before reaching the condenser, and returns to the column bottom in a reflux. The light water reaches the condenser at the column top, and hence separation of HTO, and tritium condensation in reflux water proceeds. The drawbacks of the water distillation process are as follows: the column needs to be high, resulting in necessity of a large-size apparatus; and with an increase in distillation temperature, the separation factor of light water and HTO decreases, and accordingly, the repeat count of vaporization/condensation is large, which necessitates the operation under reduced pressure. The process is often used in petroleum plants, and the like. The mechanism of separation by water distillation is expressed as the following formula (1) in equilibrium formula (J. Plasma Fusion Res., Vol. 85, No. 10 (2009) 726-735).

[C1]

$$H_2O \text{ (liquid)} + HTO \text{ (vapor)} \Leftrightarrow HTO \text{ (liquid)} + H_2O \text{ (vapor)} \quad \text{Formula (1)}$$

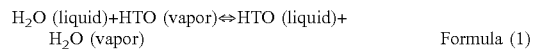

Namely, a mixed solution of $H_2O$ and HTO is heated, and once both are changed into a vapor. Then, only HTO, which tends to return to water, is returned to a liquid, thereby performing separation.

In the present invention, the present method is basically presumed to be based on the principle similar to the principle of the water distillation process, and is different from a conventional water distillation process in terms of the following: the change in state from water to water vapor in the conventional water distillation process is performed at the gas phase-liquid phase interface, whereas, when the porous body is used, the process is performed in an adsorbed state in the interlayer micro space or meso space of the porous body. In other words, the present invention can be said to be a separating technology using the change in state at the gas phase-micro/meso filling liquid phase interface by the micro space or meso space filling, and is characterized in that the separation factor of $H_2O$ and HTO can be increased. Namely, the separation factor α in the water distillation process is expressed by the ratio $P(H_2O)/P(HTO)$ of the saturated vapor pressure $P(H_2O)$ of water and the saturated vapor pressure P(HTO) of HTO at the temperature. Meanwhile, the separation factor α(ad) with the porous body undergoing micro pore filling is expressed as $P(H_2O\text{-ad})/P(HTO\text{-ad})$. The degree of acquisition of the stabilizing energy due to micro filling becomes water <HTO, and hence the difference between $P(H_2O\text{-ad})$ and P(HTO-ad) becomes noticeable. Therefore, it is considered that the separation factor α(ad) in the adsorption state becomes larger than the separation factor α in the water distillation process. In view of the separating mechanism, the separation is preferably performed at lower temperatures at which micro pore filling (capillary condensation) to the micro space or meso space of HTO tends to occur. In order to increase the separating rate, appropriate heating becomes necessary. It is preferable in terms of efficiency that the porous body with which water vapor or mist of the HTO-containing aqueous solution is brought into contact is held at a temperature of 60° C. or less, and preferably within the range of 30° C. to 60° C.

Water vapor and/or mist of the tritium-containing aqueous solution is supplied under a pressure within the range of atmospheric pressure to the saturated vapor pressure of a tritium-containing aqueous solution, and is brought into contact with a porous body. Thus, a tritium-containing water (HTO) is allowed to be selectively adsorbed on the porous body. The tritium-containing aqueous solution reduced in HTO concentration (low-tritium-content water) can be obtained by making the downstream side of the porous body more negative in pressure than the supply side of the tritium-containing aqueous solution, and giving priority to transpiration of light water ($H_2O$) from the porous body surface.

The contact of water vapor and/or mist of the HTO-containing aqueous solution with the porous body can be performed under reduced pressure, and is preferably performed under reduced pressure. Performing the contact under reduced pressure makes it possible to set the temperature at relatively lower (e.g., 60° C. or less). The pressure of reduced pressure falls, for example, within the range of $10^3$ to $10^5$ Pa, and preferably within the range of $10^3$ to $10^4$ Pa.

The porous body may include a plurality of porous bodies. The water vapor and/or mist of the HTO-containing aqueous solution may include coming into successive contact with the plurality of porous bodies. Successive contact with the plurality of porous bodies can successively reduce the HTO concentration in the aqueous solution. A HTO concentration reduction rate of the HTO-containing aqueous solution reduced in HTO concentration obtainable after contact with the porous bodies increases with an increase in number of porous bodies.

The method of the present invention includes collecting and storing the porous body occluding a prescribed amount of HTO. Alternatively, the occluded HTO can be released from the collected porous body, and the released HTO can be collected. Still alternatively, under the conditions under which the porous body occluding a prescribed amount of HTO tends to release HTO, HTO can be released, and the released HTO can be collected. For example, the following is possible: after completion of occlusion, the porous body occluding HTO is heated, thereby to be caused to release HTO, and the released HTO is collected by a cooling trap again.

The porous body which has released HTO can be repeatedly reused.

<Apparatus>

The present invention includes an apparatus to be used for reducing the HTO concentration in a HTO-containing aqueous solution. This apparatus includes:

a reservoir 10 of a raw material HTO-containing aqueous solution, means 12 that generates water vapor and/or mist of a HTO-containing aqueous solution in the reservoir 10, occluding means 20 incorporating a porous body, and means 30 that collects a HTO-containing aqueous solution reduced in HTO concentration.

Further, the apparatus of the present invention includes:

transferring means 40 for transferring the water vapor and/or mist to the occluding means, and means 50 that transfers the HTO-containing aqueous solution reduced in HTO concentration from the occluding means to the collecting means.

The porous body is a porous body having pores with a pore diameter falling within the range of 500 Å.

The porous body is the same as described previously.

One embodiment of the apparatus of the present invention will be described based on FIG. 2.

The reservoir 10 for storing the raw material HTO-containing aqueous solution (TW) has a thermocouple 1 (11) for temperature measurement, and a blow-in port 12a for dry air of means 12 for generating water vapor of TW. When mist of TW is generated, a nebulizer can be separately, provided (not shown). The reservoir 10 is set at a heating mantle 13, and is adjusted at a prescribed temperature.

The occluding means 20 can be a reactor (closed container) incorporating the porous body 22 therein, has a temperature adjusting heater at the side circumferential surface, and has openings 20in and 20out at the bottom and the top thereof, respectively. The occluding means 20 has a thermocouple 22 for measuring the temperature of the vicinity of the porous body 22.

The reservoir 10 and the occluding means 20 communicate with each other through the transferring means 40. The water vapor (or mist) generated in the reservoir 10 is transferred to the occluding means 20 by the transferring means 40.

The occluding means 20 communicates with the means 30 for collecting TW reduced in HTO concentration through the transferring means 50. The TW reduced in HTO concentration generated in the occluding means 20 is collected. The collecting means 30 of FIG. 2 includes cooling traps 30a and 30b. However, it is not intended that the present invention is limited to the cooling traps.

When a boehmite treated porous body is used as the HTO occluding material in TW, immersion of the porous body in TW for a long time causes anxiety in mechanical strength of the porous body. Thus, in the present invention, as the basic design of a removing apparatus for removing HTO for a long time with stability, preferable is a system in which using a porous body in a filter manner, and vapor of TW is transmitted therethrough using the negative pressure. The apparatus shown in FIG. 2 has a configuration according to this system. Separation proceeds under a pressure in the low vacuum region of $10^2$ Pa or more also for the negative pressure. For this reason, for the connection among respective components of the apparatus, not stainless-steel piping and a joint for high vacuum made of stainless-steel, but a Teflon tube and a joint made of Teflon less susceptible to HTO contamination are enough. It is also a large advantage that a very simple configuration of the apparatus is enough.

The apparatus of the present invention used in Examples includes a reactor capable of placing a plurality of boehmite treated porous bodies each formed into a disk with a thickness of 10 mm and a diameter of 74 mm stacked in multiple stages therein, a reservoir and a heating mantle for vaporizing HTO water used as pseudo contaminated water as a vapor, a cooling trap (PYREX (registered trademark) made of glass) for collecting water vapor which has passed through the reactor, and a diaphragm pump (KNF, N813.3 ANE, pumping speed 13 L/min) for generating a negative pressure for suction, and a dry air inflow part. These are basically connected by a Teflon tube (12φ). Further, it was specified that, including the reactor, the main path was wrapped with a ribbon heater, thereby enabling temperature control. As dry air, a high-purity product in a high pressure cylinder was used.

The porous body can include a plurality of porous bodies 22. The plurality of porous bodies 22 can be incorporated in multiple stages (series) in the occluding means 20. However, the plurality of porous bodies 22 can also be incorporated not in multiple stages (series), but partially or wholly in parallel in the occluding means 20.

The porous body can have a specific surface area falling within the range of 5 to 250 $m^2/g$.

The porous body 22 is detachable in the occluding means 20. The detachable porous body 22 can be removed from the occluding means 20, and transferred to another place, and then the occluded HTO can be extracted and collected therefrom.

Figure 5:
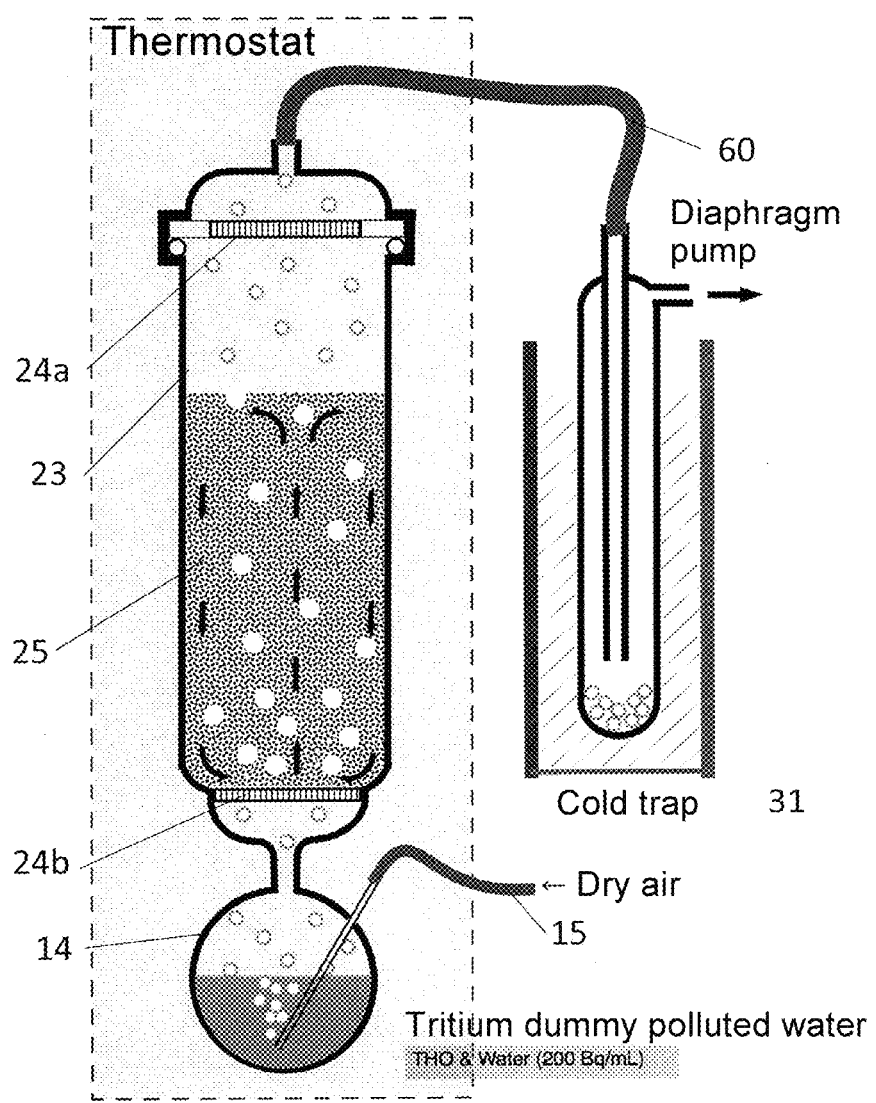
FIG. 5 is a schematic explanatory view of one aspect of the tritium occluding and removing apparatus.

Another embodiment of the apparatus of the present invention is shown FIG. 5.

Figure 2:
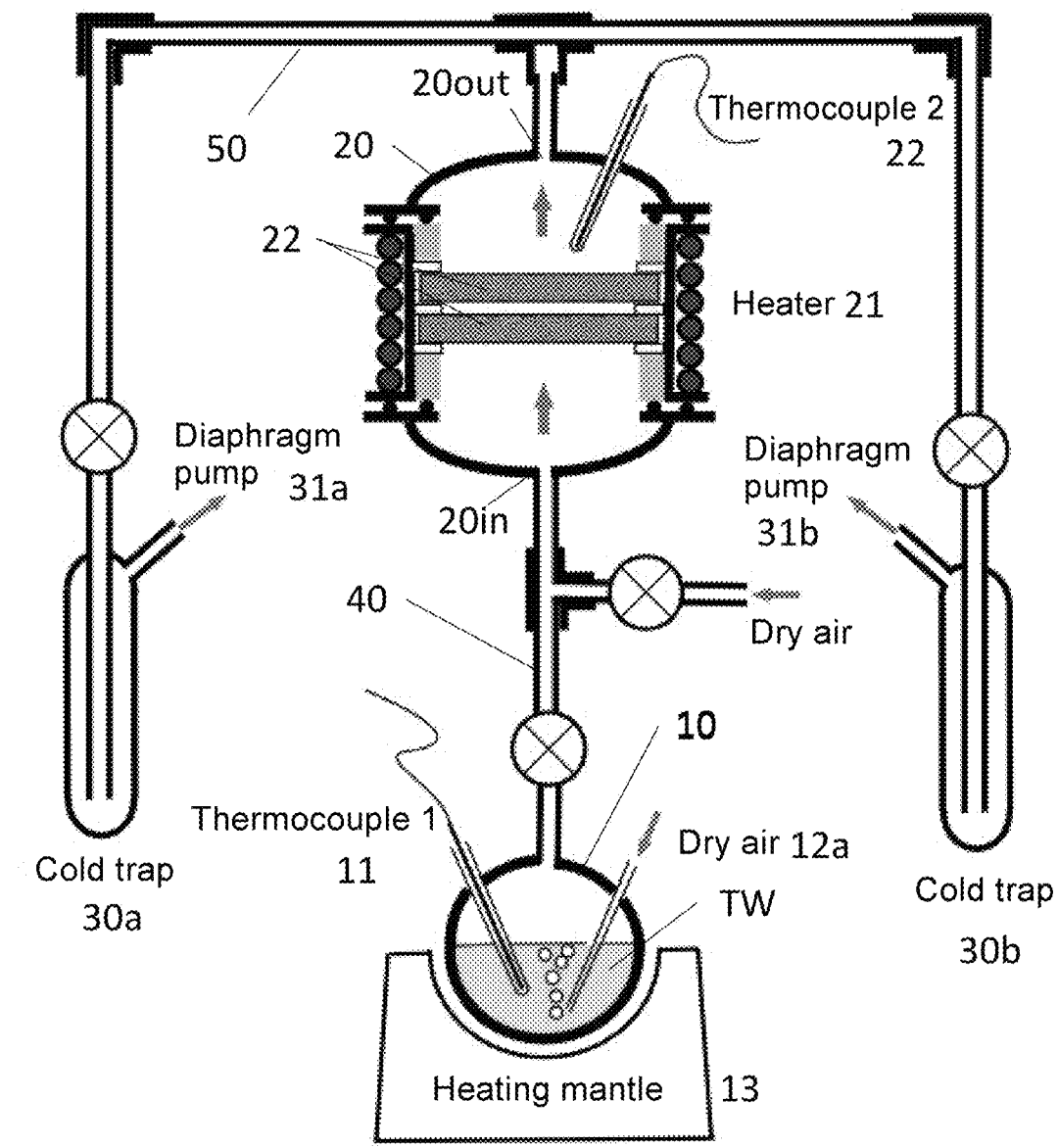
FIG. 2 is a schematic explanatory view of one aspect of a tritium occluding and removing apparatus.
Figure 3:
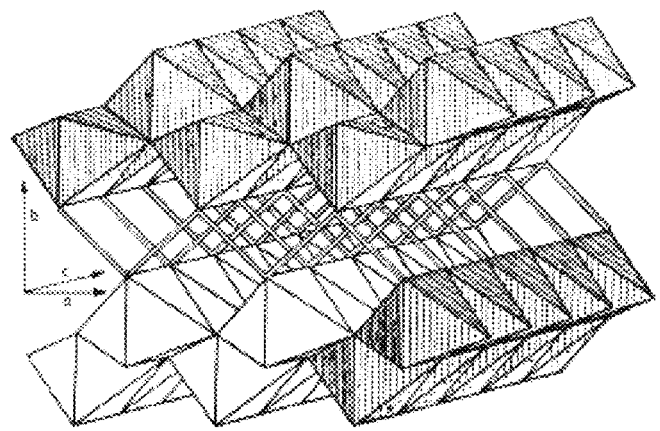
FIG. 3 shows a crystal structure of boehmite, where a doublet connecting between octahedrons shows a hydrogen bond.
Figure 4:
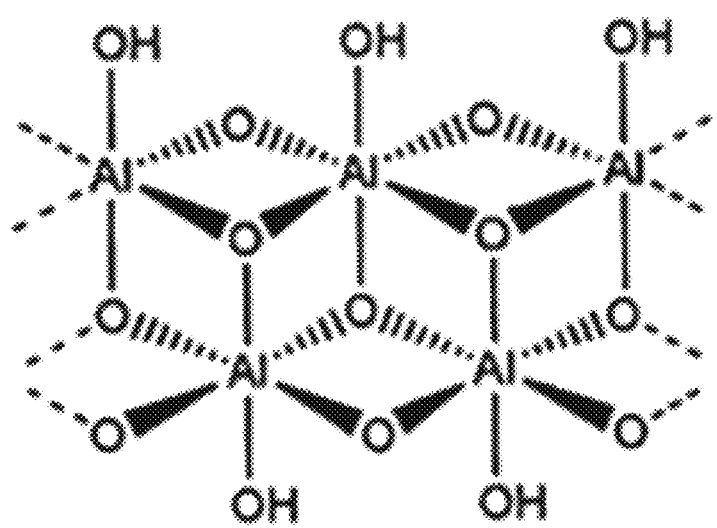
FIG. 4 shows a structure of one layer of boehmite formed of the octahedron of $AlO_6$ shown in FIG. 3.

The configuration of the apparatus is basically the same as that of the apparatus used for the porosity shown in FIG. 2. The difference therebetween resides in that the means for incorporating a porous body as an occluding body of HTO is changed to the means for incorporating a powder-shaped occluding body, and other components than the cooling trap and the diaphragm pump are arranged in a thermostat, thereby enhancing the system of temperature control. The details are as follows.

This apparatus includes a reactor (column) 23, a pseudo contaminated water reservoir 14, and a cooling trap 31. Other components than the cooling trap 31 are accommodated in a thermostat, which enables the constant temperature operation. The column 23 and the cooling trap 31 communicate with each other by transferring means 60. The column 23 is a cylindrical column (outer diameter: 50 mm, height: 230 mm) made of Pyrex. Glass filters 24a and 24b are attached at the upper and lower parts of the column, respectively, for preventing the powder of the porous body 25 from popping out. While the lower-side glass filter 24b is fixed to the column, the upper-side filter 24a is sealed and fixed by sealing with packing, and fastening of the lid. For all piping, Teflon is used. A pseudo contaminated water reservoir 14 has a volume of 100 mL, and has a structure such that when suction is caused from the column top by a diaphragm pump (not shown), atmospheric pressure dry air inflows from the blow-in port 15 into the reservoir 14.

When suction is caused from the column top by a diaphragm pump (not shown), dry air is bubbled into pseudo contaminated water in the reservoir 14. The pseudo contaminated water is formed into water vapor under saturated vapor pressure at the temperature set in the thermostat, to be supplied into the column 23 from the column 23 lower side. The column 23 is filled with a porous body. The air including the inflowed saturated vapor of the pseudo contaminated water pushes up the adsorbing material from the lower side, and floats up to the surface of the porous body layer, during which HTO in the pseudo contaminated water repeats countless collisions with the adsorbing agent. Accordingly, $H_2O$ with a weaker interaction with the porous body than that of HTO with a strong interaction therewith selectively transpires from the porous body layer surface. For this reason, the pseudo contaminated water reduced in HTO concentration is collected into the trap at the downstream part of the column.

EXAMPLES

Below, the present invention will be described in more details by way of Examples. However, Examples are illustrative of the present invention, and it is not intended that the present invention is limited to Examples.

<Tritium Experiment 1>

In a round bottom flask (reservoir) with a capacity of 100 mL connected to the lower part of the apparatus shown in FIG. 2, HTO prepared so as to be a concentration of 0.5 MBq/L was weighed in an amount of 50 mL as pseudo contaminated water. Then, one sheet of a porous body (80 g) with a thickness of 10 mm, and a diameter of 74 mm previously subjected to drying under reduced pressure at 60° C. for 6 hours was set in a reactor. In the apparatus shown in FIG. 2, the parts to be heated are mainly two parts of the reactor including the porous body and the reservoir for accommodating contaminated water therein. Further, at the piping for connecting these and the cooling trap, a ribbon heater was wrapped therearound, and the temperature was increased to 40° C. so as to prevent dew condensation from occurring.

Thereafter, the temperature of the reactor was set as desired (60° C. in Example 1, and 100° C. in Example 2), and it was confirmed that the temperature was stabilized. Then, dry ice crushed into a powder form was packed into a Dewar vessel of the trap, so that atmospheric pressure dry air was fed into the round bottom flask (reservoir) filled with pseudo contaminated water while bubbling under suction into the pseudo contaminated water. Accordingly, a mixed gas of water vapor of the pseudo contaminated water and air was directly supplied into the reactor, thereby starting a decontamination experiment. The amount of the pseudo contaminated water vapor to be supplied to the porous body is also largely associated with the temperature of the reservoir as well as the air supply rate from air supply of the reservoir. Herein, the temperature was made constant at 40° C., and this state was kept for 1 hour. However, the temperature setting of 40° C. is the heating mantle temperature control temperature, and is not the temperature obtained by directly measuring that of the pseudo contaminated water in the reservoir.

After completion of the experiment, ion exchanged water was added to the water collected by the trap to a total amount of 5 ml. The collected water diluted to a total amount of 5 ml, and 5 ml of tritium raw material water used in the experiment were measured with a liquid scintillation counter, thereby determining respective counting rates. With the counting rate of the collected water as the sample counting rate, and with the counting rate of tritium raw material water as the undiluted solution counting rate, respective specific radioactivities cpm/g were determined. Using Packard Co., TRi-CARB 2050CA for the apparatus, the measurement was performed by the LSC cocktail process using a liquid scintillation cocktail. From the comparison in specific radioactivity (2546.5 cpm/g) between the water collected by the trap and the tritium raw material water used in the experiment, the decontamination rate (%) of the water collected by the trap was calculated. For calculation of the decontamination rate, the following equation was used.

$$\text{Decontamination rate} = (\text{Undiluted solution specific radioactivity (cpm/g)} - \text{sample specific radioactivity (cpm/g)})/(\text{Undiluted solution specific radioactivity (cpm/g)}) \times 100 \quad [\text{Math. 1}]$$

Example 1

Using an aluminum powder sintered porous body (boehmite treated product, specific surface area=11.27 m$^2$/g) obtained by subjecting a porous body to a boehmite treatment (immersion in purified water with a water temperature of 90° C. or more for 10 minutes), the temperature of the reactor was set at 60° C., thereby carrying out a tritium experiment. The amount of collected water was 1.82 g, the sample counting rate was 510 cpm, the specific radioactivity was 280.2 cpm/g, and the consequent decontamination rate was 89.1%.

Example 2

Using the aluminum powder sintered porous body (boehmite treated product, specific surface area=11.27 m$^2$/g) used in Example 1 as it was, the temperature of the reactor was set at 100° C., thereby carrying out a tritium experiment. The amount of collected water was 3.00 g, the sample counting rate was 4017 cpm, the specific radioactivity was 1339.0 cpm/g, and the consequent decontamination rate was 47.3%.

Reference Example 1

Without the porous body, a tritium experiment was carried out. The amount of collected water was 2.54 g, the sample counting rate was 6426 cpm, the specific radioactivity was 2530 cpm/g, and the consequent decontamination rate was 0.65%.

TABLE 1

| Unit | Porous body | Reactor temperature ° C. | Amount of collected water g |
|---|---|---|---|
| Undiluted solution | — | — | — |
| Example 1 | Boehmite treated aluminum powder sintered porous body | 60 | 1.83 |
| Example 2 | Boehmite treated aluminum powder sintered porous body | 100 | 3.00 |
| Reference Example 1 | None | — | 2.54 |

| Unit | Specific radioactivity cpm/g | Decontamination rate % | Pore diameter range Å |
|---|---|---|---|
| Undiluted solution | 2546.5 | — | |
| Example 1 | 280.2 | 89.0 | 10 to 500 |
| Example 2 | 1339.0 | 47.4 | 10 to 500 |
| Reference Example 1 | 2530.0 | 0.65 | |

From the results described up to this point, it is considered as follows: decontamination of the tritium pseudo contaminated water by porous aluminum functions by incorporation of HTO into the boehmite interlayer at the porous aluminum surface for micro pore filling. The micropore filling is physical adsorption, and hence the adsorbed tritium can be desorbed by appropriate temperature rise, and re-collection also becomes possible.

<Tritium Experiment 2>

The experiment operation is basically the same as in the tritium experiment 1 in the case using an aluminum porous sintered body. Into the round bottom flask (reservoir) with a volume of 100 mL connected to the lower part of the apparatus shown in FIG. 5, HTO prepared so as to be a concentration of 0.2 MBq/L was placed in an amount of 50 mL as pseudo contaminated water, and a HTO occluding material dried under reduced pressure at 25° C. for 6 hours was weighed in an amount of 40 g, and was set in a thermostat. At the piping outside the thermostat connected to the cooling trap, a ribbon heater was wrapped therearound, and the temperature was increased to 40° C. so as to prevent dew condensation from occurring.

Thereafter, the temperature of the thermostat was set at 40° C., and it was confirmed that the temperature was stabilized. Thus, dry ice crushed into a powder form was packed into a Dewar vessel of the trap, thereby operating a diaphragm pump. As a result, into the round bottom flask (reservoir) filled with pseudo contaminated water, atmospheric pressure dry air was sucked into the pseudo contaminated water. Accordingly, the vapor of the pseudo contaminated water was supplied with air with bubbling directly into the column, thereby starting a decontamination experiment.

After completion of the experiment, ion exchanged water was added to the water collected by the trap to a total amount of 5 mL. The collected water diluted to a total amount of 5 mL, and 5 mL of tritium raw material water used in the experiment were measured with a liquid scintillation counter, thereby determining respective counting rates. With the counting rate of the collected water as the sample counting rate, and with the counting rate of tritium raw material water as the undiluted solution counting rate, respective specific radioactivities cpm/g were determined. Using Packard Co., Tri-GARB 2050CA for the apparatus, the measurement was performed by the LSC cocktail process using a liquid scintillation cocktail. From the comparison in specific radioactivity between the water collected by the trap and the tritium raw material water used in the experiment, the decontamination rate (%) of the water collected by the trap was calculated. The same calculation equation as that described above was used.

Example 3

Figure 6:
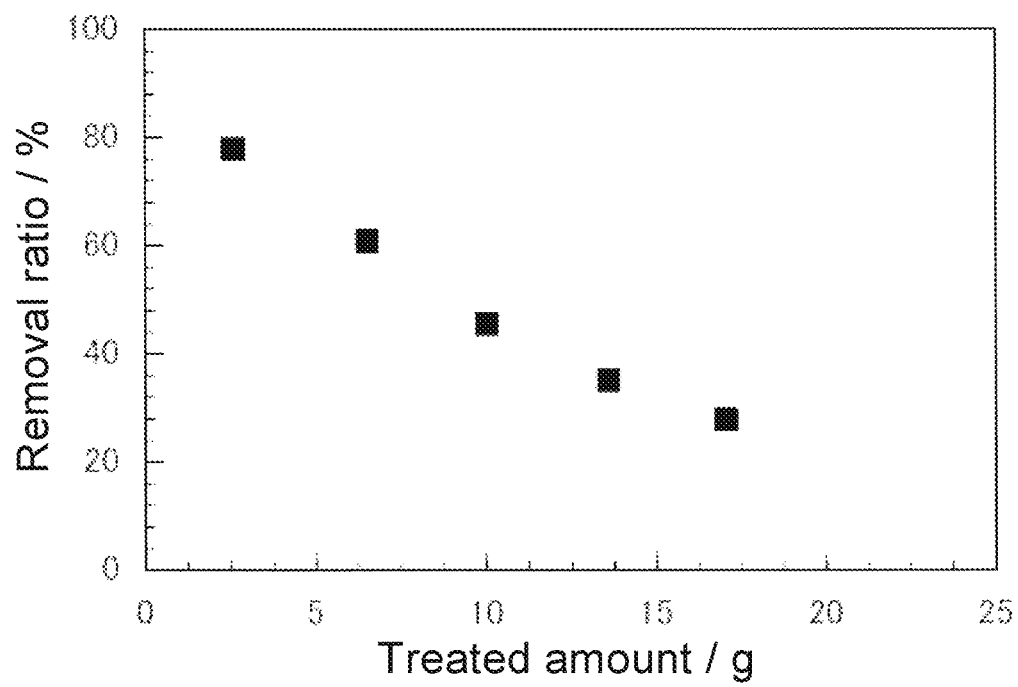
FIG. 6 shows the relationship between the pseudo contaminated water amount (throughput) and the decontamination rate obtained in Example 3.

For the HTO occluding material, an aluminum powder (boehmite+hydrothermally treated product, specific surface area 77.11 m$^2$/g) subjected to a boehmite treatment (hydrothermal treatment after immersion in purified water with a water temperature of 90° C. or more for 300 minutes) was used in an amount of 40 g, and the temperature of the thermostat was set at 40° C. Thus, a tritium experiment was carried out. FIG. 6 shows the relationship between the amount (throughput) of the pseudo contaminated water which has passed through the column and the decontamination rate. It is observed that the decontamination rate tends to decrease with an increase in the accumulated value of the throughput. However, it is indicated that even when the throughput exceeds 15 g, a decontamination rate of about 30% is kept.

Example 4

Figure 7:
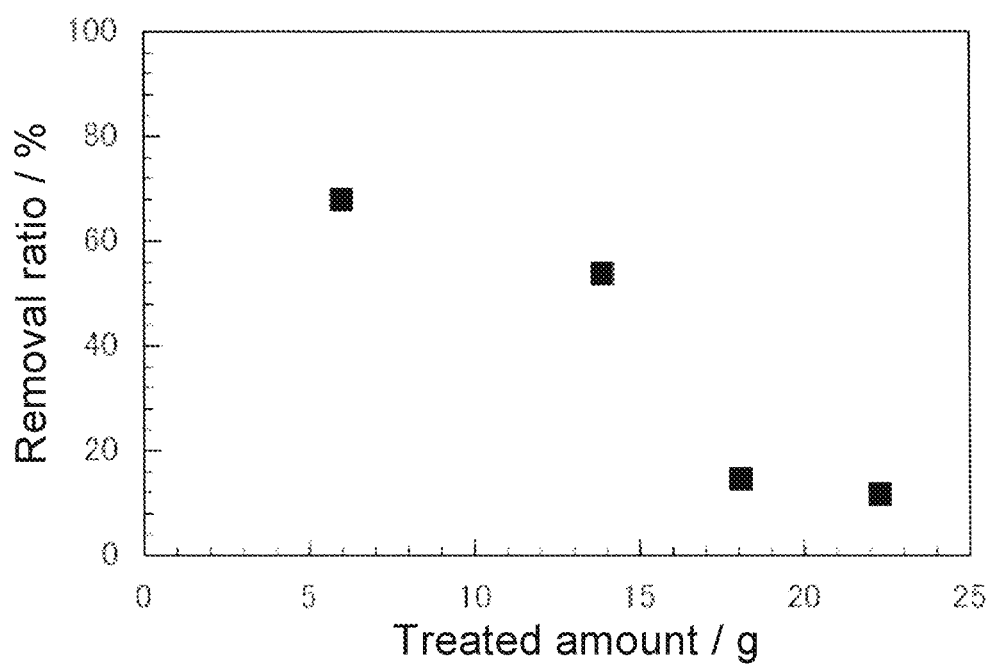
FIG. 7 shows the relationship between the pseudo contaminated water amount (throughput) and the decontamination rate obtained in Example 4.

For the HTO occluding material, zeolite (specific surface area 30.41 m²/g) was used in an amount of 40 g, and the temperature of the thermostat was set at 40° C. Thus, a tritium experiment was carried out. FIG. 7 shows the relationship between the amount (throughput) of the pseudo contaminated water which has passed through the column and the decontamination rate.

Example 5

Figure 8:
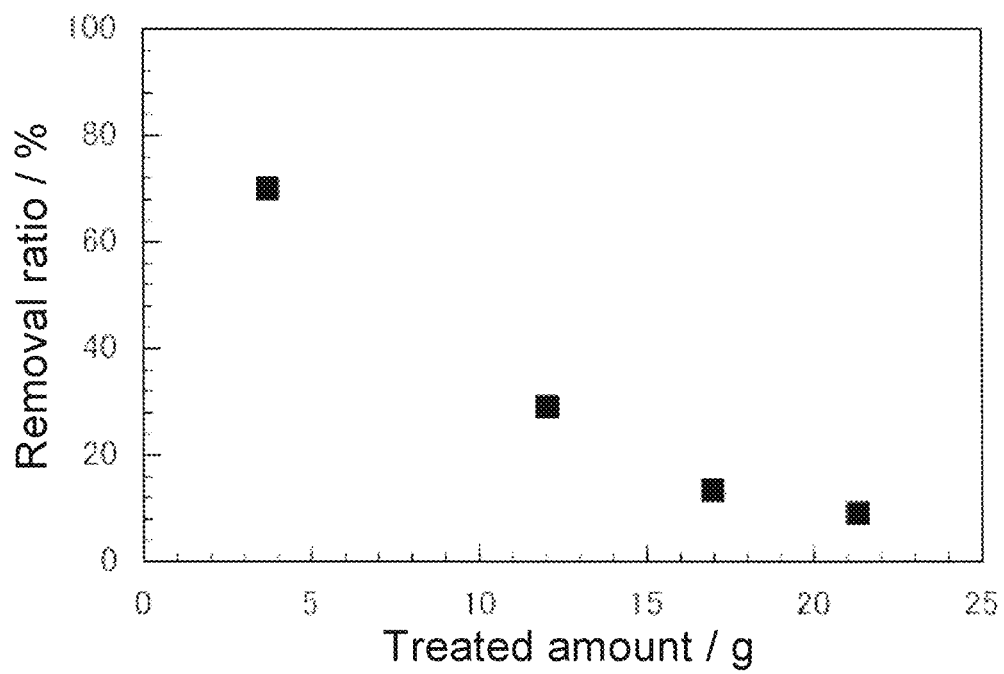
FIG. 8 shows the relationship between the pseudo contaminated water amount (throughput) and the decontamination rate obtained in Example 5.

For the HTO occluding material, γ-alumina (specific surface area 84.67 m²/g) was used in an amount of 40 g, and the temperature of the thermostat was set at 40° C. Thus, a tritium experiment was carried out. FIG. 8 shows the relationship between the amount (throughput) of the pseudo contaminated water which has passed through the column and the decontamination rate.

Example 6

Figure 9:
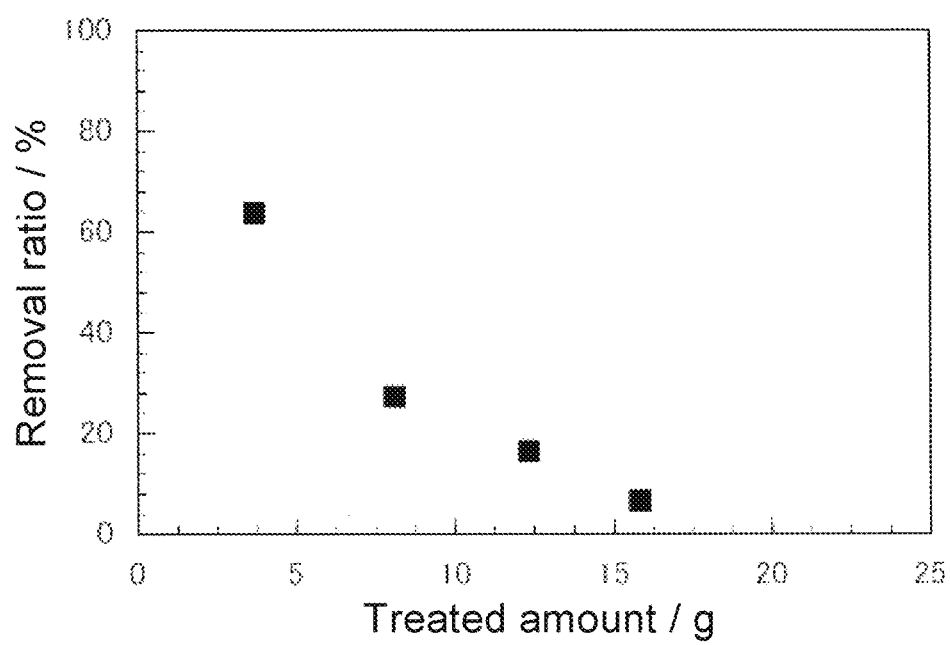
FIG. 9 shows the relationship between the pseudo contaminated water amount (throughput) and the decontamination rate obtained in Example 6.

For the HTO occluding material, silica gel (spheroidal silica gel for column chromatograph Wakosil-200, manufactured by Wako Pure Chemical Industries, Ltd., specific surface area 123.28 m²/g) was used in an amount of 40 g, and the temperature of the thermostat was set at 40° C. Thus, a tritium experiment was carried out. FIG. 9 shows the relationship between the amount (throughput) of the pseudo contaminated water which has passed through the column and the decontamination rate.

Example 7

Figure 10:
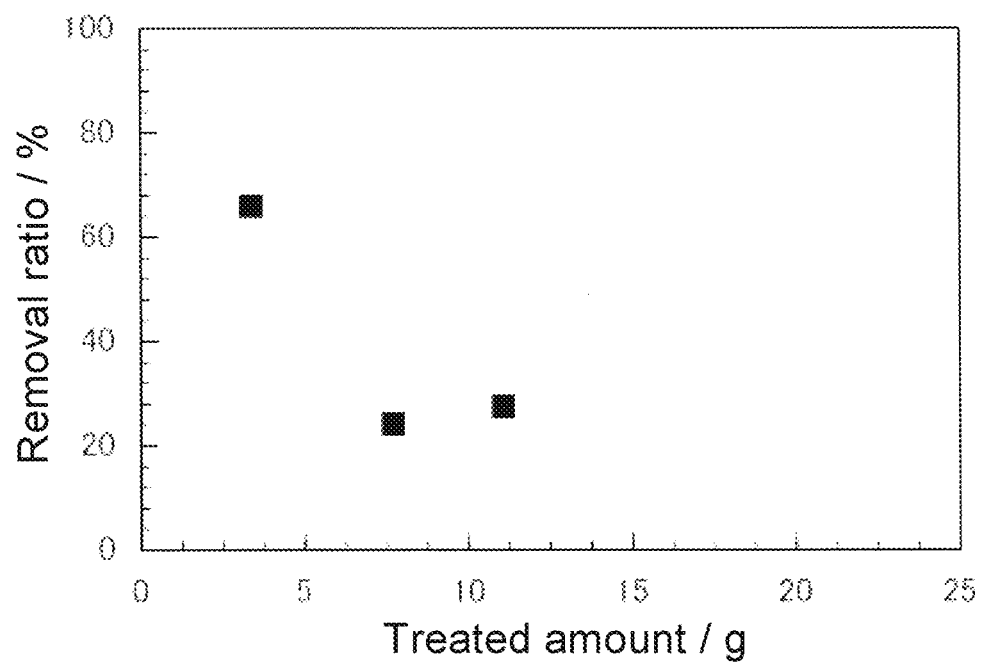
FIG. 10 shows the relationship between the pseudo contaminated water amount (throughput) and the decontamination rate obtained in Example 7.

For the HTO occluding material, commercially available boehmite (C-06, manufactured by TAIMEI CHEMICALS Co., Ltd., specific surface area 16.86 m²/g) was used in an amount of 40 g, and the temperature of the thermostat was set at 40° C. Thus, a tritium experiment was carried out. FIG. 10 shows the relationship between the amount (throughput) of the pseudo contaminated water which has passed through the column and the decontamination rate.

Up to this point, using five kinds of tritium occluding materials, the experiments were carried out. From respective plots, the straight line crossing the X axis and the Y axis was determined by the least square method, the area of the triangle surrounded by the straight line, and the X axis and the Y axis was determined, and, the tritium occlusion amount (occluding capability) per gram of the tritium adsorbent was determined. The results are shown in Table 2 below.

TABLE 2

| Example | Tritium occluding material | Occluding capability (Bq/g) | Specific surface area (m²/g) | Pore diameter range (Å) |
| --- | --- | --- | --- | --- |
| 3 | Hydrothermally treated boehmite | 55.0 | 77.11 | 20-50 |
| 4 | Zeolite | 83 | 30.41 | 7 |
| 5 | γ-Alumina | 58.8 | 84.67 | 50-100 |
| 6 | Silica gel | 47.6 | 123.28 | 60 |
| 7 | Commercially available boehmite | 42.0 | 16.85 | 100-200 |

TABLE 3

| Example | Reactor temperature | Decontamination rate 1 (%) | Decontamination rate 2 (%) |
| --- | --- | --- | --- |
| 3 | 40° C. | 77.6 | 60.7 |
| 4 | 40° C. | 82.0 | 67.8 |
| 5 | 40° C. | 69.1 | 59.8 |
| 6 | 40° C. | 63.6 | 27.1 |
| 7 | 40° C. | 65.8 | 24.1 |

Decontamination rate 1: amount of collected water 1.83 g (the same as that in Example 1)

Decontamination rate 2: amount of collected water 3.00 g (the same as that in Example 2)

The results of Table 2 are arranged in the decreasing order of the occluding capability. This results in the order of zeolite (83 Bq/g)>γ-alumina (58.8 Bq/g)>hydrothermally treated boehmite (55.0 Bq/g)>silica gel (47.6 Bq/g)>commercially available boehmite (42.0 Bq/g). From the results, it can be considered as follows: presumably, for the tritium occluding capability, the porous structure is the most important, and a larger specific surface area is more preferable.

From the results, it can be considered as follows: presumably, for the tritium occluding capability and the decontaminating capability, the porous structure (having a pore diameter within a specific range) is the most important, and a larger specific surface area is more preferable. The silica gel has a relatively lower tritium occluding capability irrespective of being porous, and having a large specific surface area. This can be considered due to the fact that the pore diameter of the used silica gel is relatively as large as 60 Å.

On the other hand, the occluding materials are arranged in the decreasing order of the decontamination rate 1 shown in Table 3. This results in the order of zeolite (82.0%)>hydrothermally treated boehmite (77.6%)>γ-alumina (69.1%) >commercially available boehmite (65.8%)>silica gel (63.6%). It is considered that the decontamination rate depends on the difference in desorbability between H₂O and HTO occluded in the pore in addition to the tritium occluding capability. When H₂O occluded in the pore is desorbed with more ease than HTO under the desorption conditions, desorption of H₂O preferentially proceeds. Accordingly, the proportion of HTO to be occluded in the pore becomes larger than that of H₂O, and the proportion of HTO included in desorbed H₂O becomes lower than that of the mixture of occluded H₂O and HTO. As a result, HTO can be separated from H₂O.

Whether the H₂O occluded in the pore is desorbed or not with more ease than HTO under the desorption conditions can be evaluated by the differential scanning calorimetry (DSC) of the porous body occluding H₂O or HTO therein. Note that HTO and D₂O are isotopic to each other, and both have a mass number of 20, and equal in mass number to each other. For this reason, the effect by mass (on the physical adsorption or the physical desorption) can be judged to be equal between HTO and D₂O.

Test Examples 1 and 2

The DSC measurement is performed in the following manner: a porous body sample dried at 100° C. is placed in a desiccator having a saturated vapor pressure at room temperature, and 5 mg of the sample which has reached adsorption equilibrium is heated at a heating rate of 10° C./min.

Figure 11:
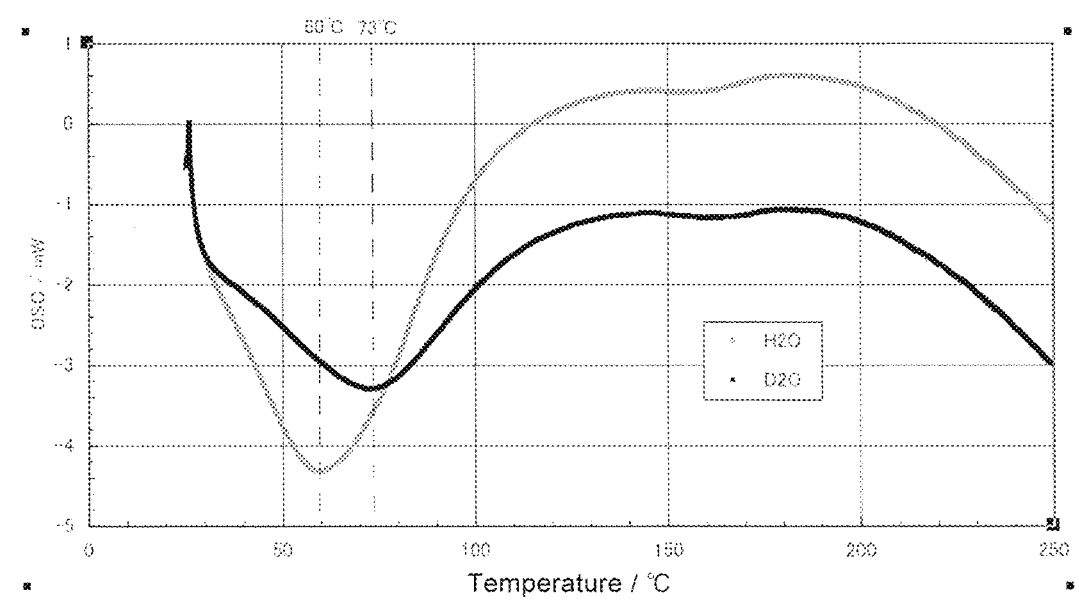
FIG. 11 shows the DSC measurement results by a rise in temperature after allowing $H_2O$ or $D_2O$ to be saturatedly adsorbed on zeolite with a pore diameter of 7 Å (mordenite, HSZ-640) at 60° C.
Figure 12:
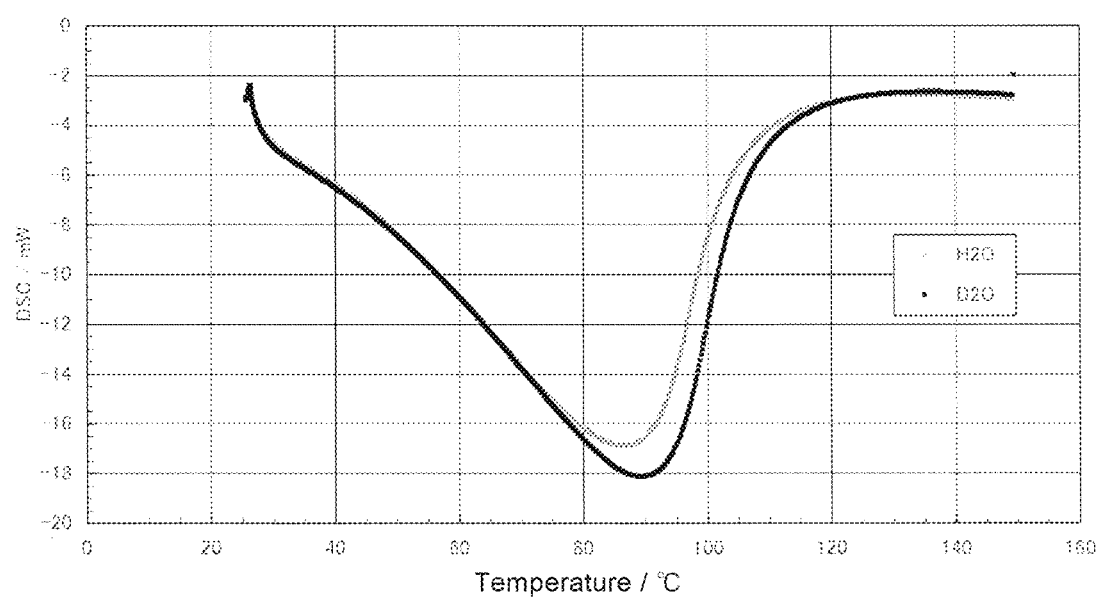
FIG. 12 shows the DSC measurement results by a rise in temperature after allowing $H_2O$ or $D_2O$ to be saturatedly adsorbed on silica gel for column chromatograph Wakosil C-200 (B type, pore diameter 60 Å) at 60° C.

FIG. 11 shows the DSC measurement results by temperature rise after allowing $H_2O$ or $D_2O$ to be saturatedly adsorbed on zeolite with a pore diameter of 7 Å (mordenite, HSZ-640) at 60° C. FIG. 12 shows the DSC measurement results by temperature rise after allowing $H_2O$ or $D_2O$ to be saturatedly adsorbed on silica gel for column chromatograph Wakosil C-200 (B type, pore diameter 60 Å) at 60° C. Also in the case using an A type silica gel (pore diameter 25 Å), the results were almost the same as the results of FIG. 12 of the B type silica gel (pore diameter 60 Å).

With the results of FIG. 11, each heat absorption due to desorption (transpiration) of $H_2O$ and $D_2O$ starts from in the vicinity of 30° C., and both of the termination temperatures are in the vicinity of about 120° C. However, the profiles of the endothermic peaks in that period clearly differs. Comparison between respective temperatures of the endothermic peaks indicates that that of $H_2O$ is 60° C. and that of $D_2O$ is 73° C. Thus, a difference of 10° C. or more is observed therebetween. Therefore, it is presumed that decontamination at the temperature (60° C.) at which the difference between the two lines is the largest can maximize the $H_2O/D_2O$ separating efficiency. Then, for causing a difference in transpiration temperature between $H_2O/D_2O$, the size of the pore diameter of the porous adsorbent matters. Thus, the pore diameter 7 Å of natural zeolite (mordenite) is recognized important in the sense of selective desorption of $H_2O$ from the pore at 60° C. (when the diameter is too small, the transpiration temperature becomes 100° C. or more, making the separation impossible, or too large diameter eliminates the selectivity). Further, the endothermic profile (black line) at from 30° C. to 80° C. of $D_2O$ indicates the manner in which transpiration apparently becomes less likely to be caused as compared with $H_2O$ (grey line). This supports the fact that the interaction between $D_2O \Leftrightarrow$ pore is larger than the interaction between $H_2O$ pore in the zeolite pore. Namely, this is presumed to be the point of the mechanism of separation of $H_2O/D_2O$.

From the results of FIG. 12, comparison in temperature of the endothermic peak indicates 87.5° C. for $H_2O$, and 90° C. for $D_2O$. Thus, although the difference therebetween is small, $D_2O$ is slightly less likely to be desorbed. Therefore, it is indicated that silica gel also exerts the $H_2O/D_2O$ separating action in its own way. In the case of silica gel, the pore diameter is 25 Å for the A type, and 60 Å for the B type, and is thus normalized (JIS Z 0701 type 1 and JIS Z 0701 type 2), both of which are four or more times larger than the pore diameter of natural zeolite. When the pore diameter increases so large, condensation in the pore hardly occurs. Therefore, conceivably, the phase transition from the gas phase to the liquid phase also does not occur, resulting in shrinkage of the difference in transpiration temperature, leading to less $H_2O/D_2O$ separation than with natural zeolite.

INDUSTRIAL APPLICABILITY

The present invention is useful for the field relating to the decontamination method of a tritium-containing aqueous solution.

Particularly, the average HTO concentration of the tritium contaminated water due to the Fukushima nuclear power plant accident is said to be about 1 MBq/L. Further, with Tokyo Electric Power Company Holdings, Inc., the ground water drawn up through a ground water bypass or a subdrain is dumped into the sea. The standard value at that step is set at 1500 Bq/L by the agreement with fisheries cooperatives. Decontamination of contaminated water with a concentration of 1 MBq/L to a level of 1500 Bq/L requires a decontamination rate of 99.85% or more. This can be attained by using two or three sheets of porous bodies in a stacked manner when the porous bodies in the present state are used as they are, which is useful for the field relating to the decontamination method of tritium.

REFERENCE SIGNS LIST 10, 14 Reservoir
11, 22 Thermocouple for measuring temperature
12 Means for generating water vapor and/or mist
12a, 15 Blow-in port of dry air
13 Heating mantle
20, 23 Occluding means
30, 31 Means for collecting HTO-containing aqueous solution (cold trap)
40, 50, 60 Transferring means

The invention claimed is:

1. A method of reducing HTO concentration in a tritium (HTO)-containing aqueous solution, the method comprising:
continuously or intermittently bringing water vapor and/or mist of a HTO-containing aqueous solution into contact with a porous body having pores with a pore diameter within the range of 500 Å or less to allow HTO in the HTO-containing aqueous solution to be selectively occluded in the porous body, and obtaining an unoccluded liquid as a HTO-containing aqueous solution reduced in HTO concentration, which will be hereinafter referred to as low-HTO-content water, wherein water vapor or mist of the HTO-containing aqueous solution is brought into contact with the porous body while the porous body is held at a temperature of 30° C. or higher.

2. The method according to claim 1, wherein the porous body has at least a pore with a pore diameter falling within the range of more than 4 Å and 25 Å or less or the porous body has a specific surface area ranging from 5 to 250 m²/g.

3. The method according to claim 1, wherein the porous body is an inorganic material porous body.

4. The method according to claim 3, wherein the inorganic material porous body is a porous body containing at least one selected from the group consisting of zeolite, γ-alumina, silica gel, boehmite, and aluminum; or the inorganic material porous body is a porous body of aluminum having a boehmite coating; or the inorganic material porous body is a powder; or the inorganic material porous body is a powder sintered porous body.

5. The method according to claim 1, wherein the porous body with which water vapor or mist of the HTO-containing aqueous solution is brought into contact is held at a temperature equal to or lower than an endothermic peak temperature in differential scanning calorimetry of HTO occluded in the pore of the porous body.

6. The method according to claim 5, wherein the porous body has an endothermic peak temperature in differential scanning calorimetry of HTO occluded in the pore of the porous body falling within the range of 60° C. to 100° C.

7. The method according to claim 1, wherein water vapor and/or mist of the HTO-containing aqueous solution is supplied under a pressure within the range of from atmospheric pressure to the saturated vapor pressure of the HTO-containing aqueous solution, and is brought into contact with the porous body, thereby allowing HTO to be selectively adsorbed on the porous body, and the HTO-containing aqueous solution reduced in HTO concentration (low-HTO-content water) is obtained by making the downstream side of the porous body more negative in pressure than the supplying side of the HTO-containing aqueous solution to allow preferential transpiration of light water from the porous body surface.

8. The method according to claim 1, wherein the contact between the water vapor and/or mist of the HTO-containing aqueous solution and the porous body is performed under reduced pressure.

9. The method according to claim 1, wherein the porous body comprises a plurality of porous bodies, and the method comprises that the water vapor and/or mist of the HTO-containing aqueous solution comes into sequential contact with the plurality of porous bodies; and a HTO concentration reduction rate of the HTO-containing aqueous solution reduced in HTO concentration obtained after contact with the porous body increases with an increase in number of the porous bodies.

10. The method according to claim 1, the method further comprises collecting and storing the porous body occluding a prescribed amount of HTO or further comprises collecting a porous body occluding a prescribed amount of HTO and allowing the collected porous body to release the occluded HTO and collecting the released HTO.

11. The method according to claim 1, wherein the contact of water vapor and/or mist of the HTO-containing aqueous solution with the porous body is performed at a pressure within the range of $10^3$ to $10^5$ Pa.

12. The method according to claim 1, wherein a temperature of the porous body is at 100° C. or less when the contact of water vapor and/or mist of the HTO-containing aqueous solution with the porous body is performed.

* * * * *